United States Patent
South et al.

[15] 3,652,920
[45] Mar. 28, 1972

[54] REGULATED EXCITER-GENERATOR ELECTRICAL POWER APPARATUS RESPONSIVE TO EXCITER FIELD CURRENT

[72] Inventors: William H. South, McKeesport; Frederick W. Keay, Irwin, both of Pa.

[73] Assignee: Westinghouse Electric Corporation, Pittsburgh, Pa.

[22] Filed: Dec. 3, 1970

[21] Appl. No.: 94,844

[52] U.S. Cl. .............................. 322/19, 322/24, 322/25, 322/60, 322/87, 322/DIG. 2
[51] Int. Cl. ........................................................ H03p 9/14
[58] Field of Search ..................... 322/23, 24, 25, 28, 19, 60, 322/73, 86, 87, DIG. 2

[56] References Cited

UNITED STATES PATENTS

| 3,534,228 | 10/1970 | Hyvarinen et al. | 322/59 X |
|---|---|---|---|
| 3,170,109 | 2/1965 | Roof | 322/28 |
| 3,210,603 | 10/1965 | Calfee et al. | 322/DIG. 2 |
| 2,913,656 | 11/1959 | Bliss | 322/19 X |

Primary Examiner—Lewis H. Myers
Assistant Examiner—H. Huberfeld
Attorney—A. T. Stratton, F. E. Browder and Donald R. Lackey

[57] ABSTRACT

Regulated electric power apparatus including a dynamoelectric machine and exciter. A control feedback loop responsive to the parameter to be regulated is modified by a supplementary negative feedback loop responsive to the exciter field current, which forces current into the field and reduces the effective exciter time constant.

7 Claims, 3 Drawing Figures

REGULATED EXCITER-GENERATOR ELECTRICAL POWER APPARATUS RESPONSIVE TO EXCITER FIELD CURRENT

BACKGROUND OF THE INVENTION

1. Field of the Invention

The invention relates in general to electrical power apparatus, and more specifically to regulated dynamoelectric machines.

2. Description of the Prior Art

Fast response, high performance, electronic exciters have been developed, which, because of their short time constants, improve the transient stability of synchronous dynamoelectric machines. Many installations using electronic exciters have been installed at hydroelectric plants where long transmission lines are generally required to connect the plant with the electrical system, and stability is thus an important design consideration. The short time constants of electronic exciters make it possible to apply very effective positive damping of machine oscillations using suitable supplemental signals. While supplemental signals may be used to provide positive damping of conventional rotating exciters, in general, more effective damping is obtained with the faster responding, lower time constant electronic exciter systems.

The application of the faster responding electronic excitation systems to synchronous dynamoelectric machines or alternators driven by steam turbines has developed at a much slower pace. Steam turbine driven alternators traditionally utilize an excitation system using the shaft power source concept, i.e., a direct-connected rotating exciter, which has the advantage of being independent of power system disturbances. The brushless excitation systems which employ a shaft driven alternator-rectifier-exciter combination, with solid state diode rectifiers mounted on the rotating shaft and connected directly between the rotating exciter armature and rotating alternator field, have added to he desirability of such a system, as all commutators, collector rings and associated brushes are eliminated, improving the reliability and reducing the maintenance of such systems. However, the time constant of such rotating excitation systems is normally about 1 second, and it may be reduced by careful design of the exciter to about 0.2 second, while speeds comparable with electronic systems, i.e., less than 0.05 second, would be desirable in order to provide more effective positive damping for damping torsional oscillations of the alternator rotor. Replacing the shaft mounted diode rectifiers with three element controlled rectifiers would improve the response time of the excitation system, but at the expense of adding complexity to the system, as well as requiring an oversize alternator operating continuously at ceiling Thus, it would be desirable to provide new and improved regulated electrical power apparatus including an alternator, a brushless rotating exciter, diode type, shaft mounted rectifiers, and regulator system, with the brushless exciter having a time constant which compares favorably with the time constant of electronic excitation systems.

SUMMARY OF THE INVENTION

Briefly, the present invention is new and improved regulated electrical power apparatus which utilizes a dynamoelectric machine or alternator having a rotatable field winding and stationary armature, a brushless exciter having a rotatable armature and a stationary field winding, shaft mounted diode rectifiers electrically connected between the exciter armature and alternator fields, and a regulator system having a control loop which includes a power amplifier connected to the exciter field winding. The first control signal is derived from the parameter or quantity of the dynamoelectric machine to be regulated, and this signal is modified by a negative feedback signal provided by a supplemental control loop, with the feedback signal being responsive to the magnitude of the current flowing in the exciter field winding. The resulting modified error signal is amplified and applied to the power amplifier, reducing the effective time constant of the exciter by the amount of gain acting upon the modified error signal.

BRIEF DESCRIPTION OF THE DRAWING

The invention may be better understood, and further advantages and uses thereof more readily apparent, when considered in view of the following detailed description of exemplary embodiments, taken with the accompanying drawings, in which.

DESCRIPTION OF THE PREFERRED EMBODIMENTS

Figure 1:
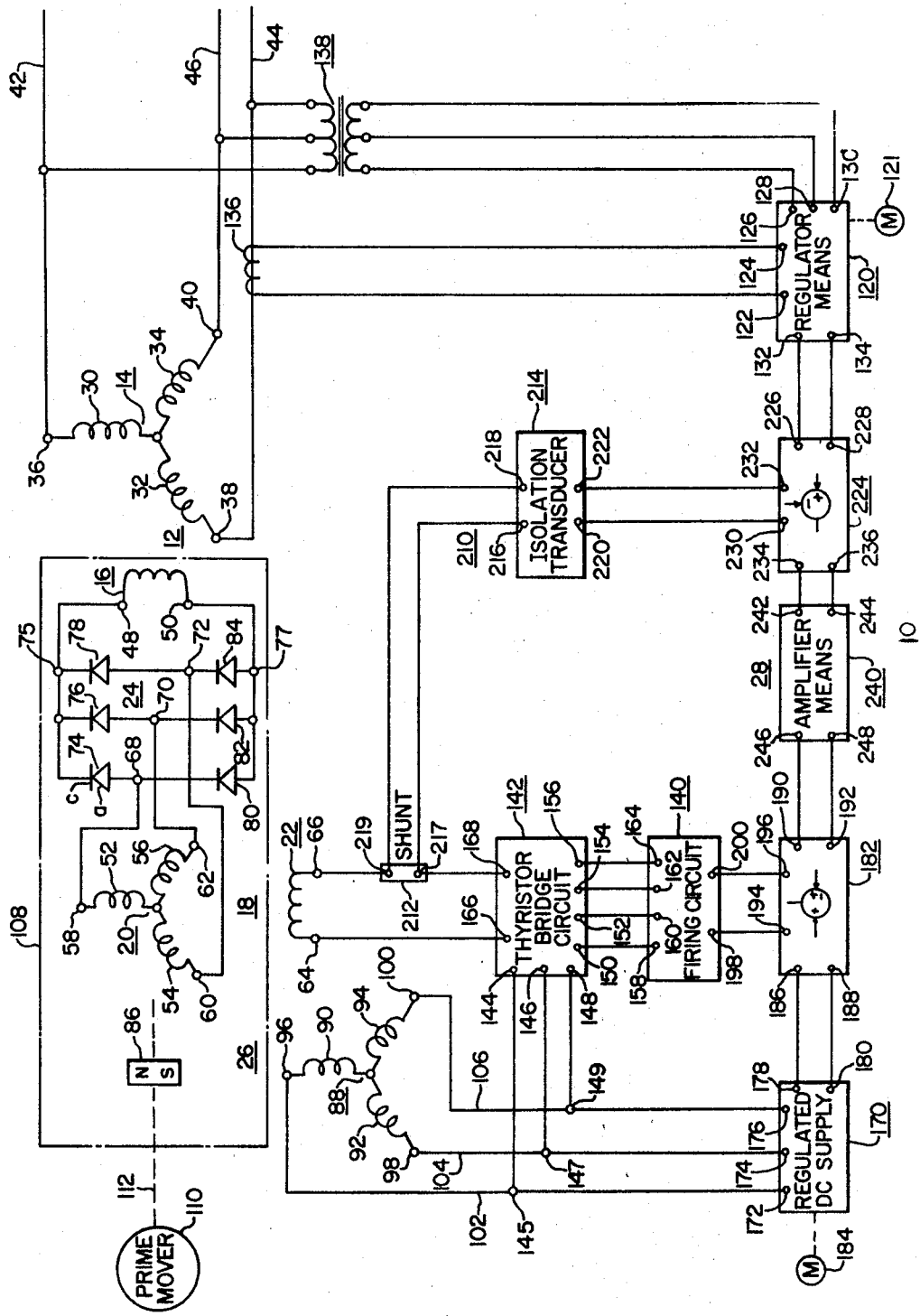
FIG. 1 is a partially schematic and partially block diagram of regulated electrical power apparatus constructed according to the teachings of the invention.

Referring now to the drawings, and FIG. 1 in particular, there is shown a partially schematic and partially block diagram of regulated electrical power apparatus 10 constructed according to the teachings of the invention. Regulated power apparatus 10 includes a synchronous dynamoelectric machine or alternator 12 having a stationary armature 14 and a rotatable field winding 16, a brushless exciter 18 having a rotatable armature 20 and a stationary field winding 22, rectifier means 24, a source 26 of alternating potential, which may be a pilot exciter, and a main feedback or control loop 28.

The stationary armature 14 of alternator 12 includes three-phase windings 30, 32 and 34 connected in wye, having output terminals 36, 38 and 40, respectively, connected to supply an alternating potential to a three-phase electrical system, represented by electrical conductors 42, 44 and 46. The excitation field winding 16 of alternator 12 includes input terminals 48 and 50.

The armature 20 of brushless exciter 18 includes windings which develop an alternating potential, such as three-phase windings 52, 54 and 56 connected in wye, and having output terminals 58, 60 and 62. Excitation field winding 22 of exciter 18 has input terminals 64 and 66.

Rectifier means 24 is a bridge rectifier constructed to accommodate the type of alternating output voltage provided by the armature 20 of exciter 18. For example, when the armature 20 provides a three-phase alternating potential, rectifier means 24 is a three-phase bridge, preferably full-wave, as illustrated, having alternating potential input terminals 68, 70 and 72 electrically connected to the output terminals unidirectional potential output terminals 75 and 77 connected to input terminals 48 and 50, respectively, of the alternator field winding 16.

Rectifier means 24 includes a plurality of diode or two element rectifier devices 74, 76, 78, 80, 82 and 84, each having an anode electrode a and a cathode electrode c, such as silicon rectifier diodes. Diodes 74, 76 and 78 have their cathode electrodes connected to output terminal 75 and their anode electrodes connected to input terminals 68, 70 and 72 respectively. Diodes 80, 82 and 84 have their cathode electrodes connected to input terminals 68, 70 and 72, respectively, and their anode electrodes are connected to output terminal 77.

The pilot exciter 26 may be a permanent magnet generator having rotatable magnets, represented by magnet 86, and a stationary armature 88 having phase windings 90, 92 and 94 connected to output terminals 96, 98 and 100, respectively, which are connected to conductors 102, 104 and 106, respectively.

The rotatable elements of the regulated electrical power apparatus 10, i.e., the magnets 86 of the permanent magnet generator 26, the armature 20 of the brushless exciter 18, rectifier means 24, and field winding 16 of alternator 12, are given the general reference numeral 108. These rotatable elements 108 are driven by a suitable prime move 110, such as a steam turbine, via shaft means indicated generally by dotted line 112. The electrical power elements of the regulated electrical power apparatus 10 thus derive their input power from shaft means 112, and the apparatus is devoid of commutators, collector rings and brushes.

The main feedback or control loop 28 includes regulator means 120, which has input terminals 122, 124, 126, 128 and 130 connected to obtain a measure of the predetermined parameter or electrical quantity to be controlled, and output terminals 132 and 134 which provide an output or first control signal responsive to the magnitude of the predetermined parameter. The regulated level of the predetermined parameter may be adjusted, such as indicated by the motor 121.

Regulator means 120, for example, may be a voltage regulator with reactive current compensation, such as disclosed in U.S. Pat. No. 3,211,987, which is assigned to the same assignee as the present application, with regulator 120 having input terminals 122 and 124 connected to a current transformer 136 disposed to obtain a measure of the current flowing in one of the conductors of the electrical system, such as conductor 44, and with input terminals 126, 128 and 130 connected to obtain a measure of the output voltage of alternator 12 via a potential transformer 138.

In the prior art, the control signal provided by regulator means 120 directly controls the magnitude of the excitation current flowing through the field winding 22 of the brushless exciter 18. For example, the output of regulator means 120 may be applied to a firing circuit 140, which provides firing signals for a power amplifier 142 connected to apply a controllable unidirectional potential to the excitation field winding 22 of the brushless exciter 18. The power amplifier 142 may be a bridge rectifier having controlled rectifiers or thyristors connected in predetermined legs thereof, as shown in the hereinbefore mentioned U.S. Patent, and the firing circuit 140 may be of any suitable type, such as the one disclosed in the same patent.

The power amplifier or thyristor bridge circuit 142 has input terminals 144, 146 and 148 connected to a source of alternating potential, such as to conductors 102, 104 and 106 at junctions 145, 147 and 149, respectively, input terminals 150, 152, 154 and 156 connected to receive firing signals from the firing circuit 140, such as to output terminals 158, 160, 162 and 164, respectively, of firing circuit 140, and output terminals 166 and 168 connected to terminals 64 and 66 of the excitation field winding 22 of the exciter 18, applying a controlled unidirectional potential to field winding 22.

Instead of utilizing the control signal from regulator means 120 to directly control the firing angle of the thyristor bridge circuit 142, a base unidirectional control signal may be provided by a regulated direct current supply 170, which has input terminals 172, 174 and 176 connected to source 26 of alternating potential via conductors 102, 104 and 106. Regulated direct current supply 170 provides a controlled unidirectional signal at its output terminals 178 and 180, which is added algebraically to the control or regulating signal from regulator means 120 in summing means 182. The control signal from regulator means 120 bucks or boosts the base excitation signal provided by the regulated DC supply 170. The regulated magnitude of the output voltage of DC supply 170 may be adjustable, as indicated by motor 184.

Summing means 182 includes input terminals 186 and 188 connected to receive the unidirectional signal from regulated direct current supply 170, input terminals 190 and 192 connected to receive the unidirectional signal from regulator means 120, and output terminals 194 and 196 connected to supply the resulting signal to the input terminals 198 and 200 of firing circuit 140. A typical summing circuit would include a resistor connected from terminal 186 to terminal 194, a resistor connected from terminal 190 to terminal 194, means connecting terminals 188, 196 and 192 in common, and a resistor connected from terminal 194 to the commonly connected terminals 188, 196 and 192.

In the prior art, the output or control signal of regulator means 120, which may be amplified in a suitable preamplifier circuit as disclosed in the hereinbefore mentioned patent, would be applied directly to input terminals 190 and 192 of summing means 102. With this arrangement, however, the time constant of the system, even with a specially designed exciter, would be about 0.2 second, well above the 0.05 second maximum time constant characteristic of electronic excitation systems.

The present invention discloses a new and improved arrangement for brushless excitation systems, as disclosed and described to this point, which reduces the effective time constant of the excitation system to 0.05 second, or less, without replacing the shaft mounted diode rectifier means 24 with controlled rectifiers.

More specifically, a supplemental feedback loop 210 is provided which modifies the output or control signal of regulator means 120 with a negative feedback signal, i.e., a signal which opposes the disturbance in the regulated parameter, to return the regulated parameter to its original state. The supplemental feedback loop 210 obtains a signal responsive to the magnitude of the unidirectional current flowing in the exciter field winding 22, such as by using the voltage drop across a shunt 212 connected serially with the field winding 22 of exciter 18. The negative feedback signal is amplified to the desired control range, and the relatively high voltage to ground of the excitation field winding 22 is isolated from the relatively low voltage control loop 28, by a current isolation transducer 214. Current isolation transducer 214 has input terminals 216 and 218 connected to terminals 217 and 219, respectively, of the shunt 212, and output terminals 220 and 222 which provide a unidirectional potential having a magnitude responsive to the magnitude of the current flowing through the field winding 22. Isolation transducer 214 may be a high frequency magnetic amplifier having a very low time constant, such as about 0.005 second.

The negative feedback signal from supplementary feedback loop 210 is algebraically combined with the control signal from regulator means 120 in summing means 224. Summing means 224 has input terminals 226 and 228 connected to output terminals 132 and 134, respectively, of regulator means 120, input terminals 230 and 232 connected to output terminals 220 and 222 of isolation transducer 214, and output terminals 234 and 236 which provide the error or actuating signal resulting from the modification of the control signal provided by regulator means 120 by the negative feedback signal, i.e., the negative feedback signal is subtracted from the control signal to provide the error signal at the output terminals 234 and 236 of means 224. The proper interaction of the negative feedback signal and the control signal may be obtained by constructing the regulator means 120 to provide an output signal in a predetermined range and predetermined polarity, and selecting the isolation transducer 214 to provide an output signal having the same range as the output signal of the regulator means 120, but of opposite polarity. The resulting error signal may thus be of either polarity, bucking or boosting the base signal provided by the regulated DC supply 170. Summing means 224 may be constructed similar to summing means 182, connecting terminals 236, 232 and 228 in common, connecting a resistor from this common connection to terminal 230, connecting a resistor from terminal 234 to terminals 234, and connecting a resistor from terminals 226 to terminal 234.

Negative feedback reduces the overall gain of the control loop 224, but this is compensated for by connecting gain amplifier means 240 between the output terminals 234 and 236 of summing means 224 and input terminals 190 and 192 of summing means 182. The higher the gain of amplifier means 240, the lower the effective time constant of the excitation system. The amount of gain that may be added to the loop by amplifier means 240 is determined by the stability characteristics of the loop, with a gain of 10 being easily achievable, and a gain as high as 30 may be used without encountering loop instability. A gain of 10, for example, would result in a time constant reduction of 10, making a 0.2 second time constant system appear to have a 0.02 second time constant for small signal changes. This is true whether or not the excitation system has a high initial response, i.e., a response time of about 0.1 second or less. Excitation system voltage response time is the time required for the excitation voltage to reach 95 percent of ceiling voltage under specified load and excitation conditions. High initial response may be achieved, if desired, by field forcing, i.e., selecting the pilot exciter 26 to have substantially higher kilowatt rating than would otherwise be required, such as about five times greater.

Figure 2:
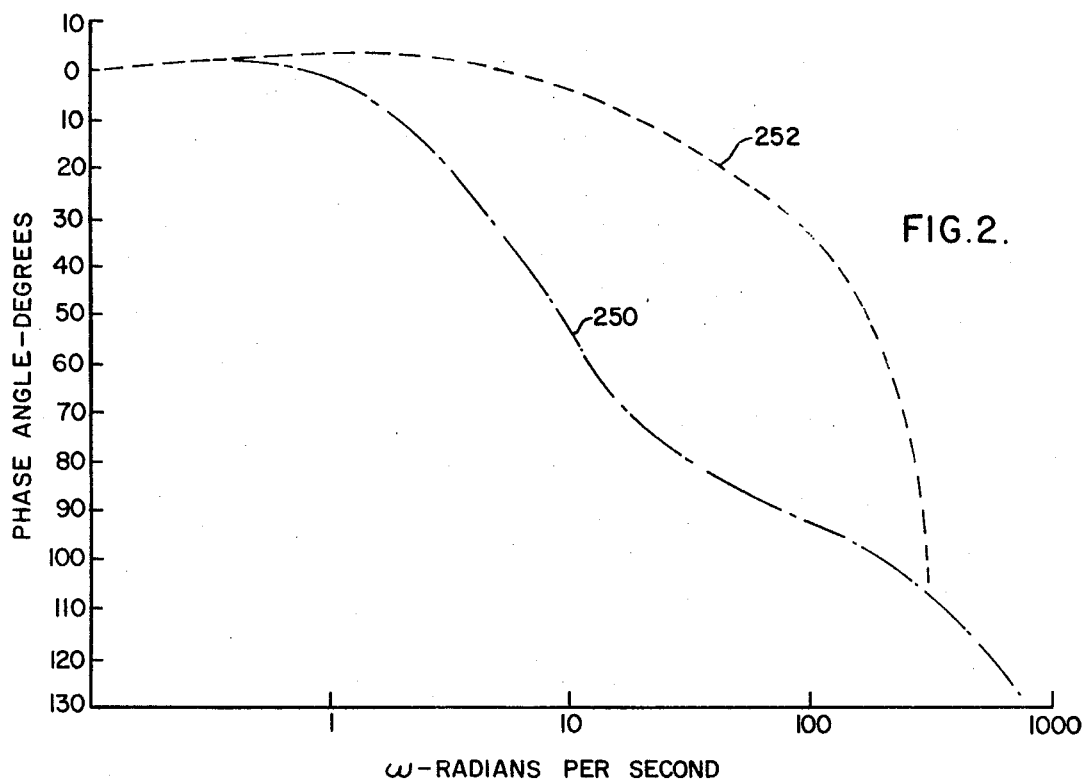
FIG. 2 is a frequency response curve plotting the phase angle between the input and output signals of a brushless excitation system, versus frequency of the input signal, for regulated electrical power apparatus constructed according to the teachings of the invention, and regulated electrical power apparatus constructed according to the teachings of the prior art.
Figure 3:
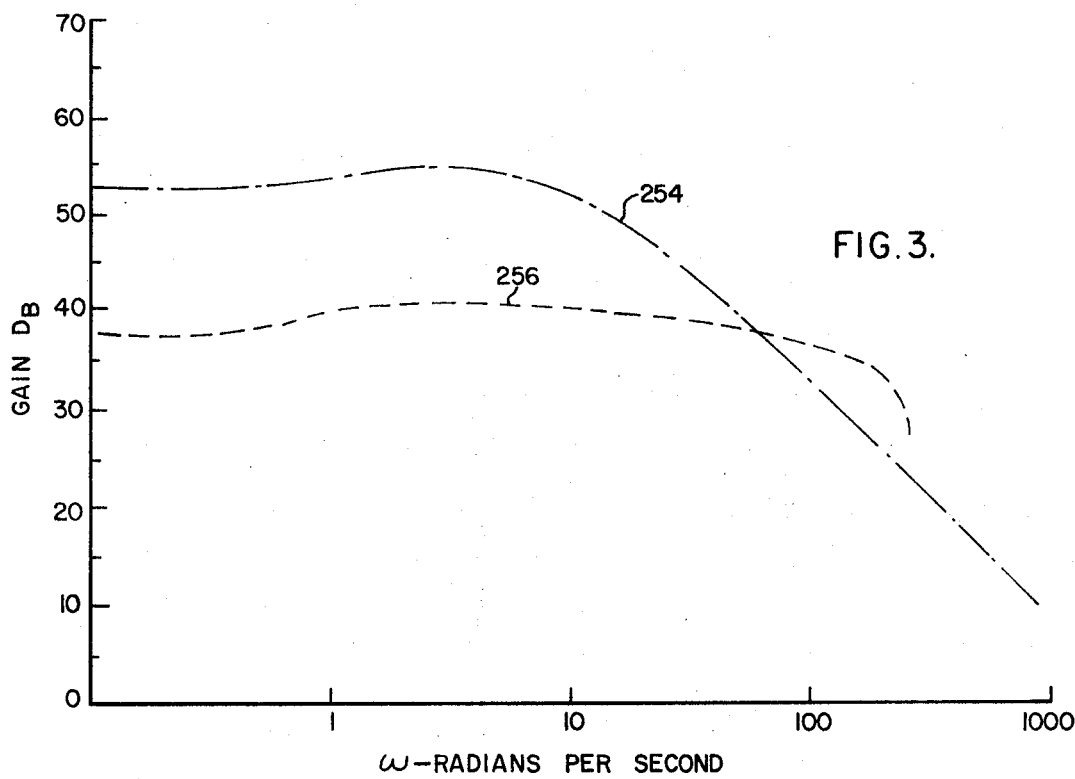
FIG. 3 is a frequency response curve plotting the gain of a brushless excitation system versus frequency of an input signal applied to the exciter, for regulated electrical power apparatus constructed according to the teachings of the invention, and regulated electrical power apparatus constructed according to the teachings of the prior art.

Frequency response tests were conducted on regulated electrical power apparatus constructed as shown in FIG. 1, with and without the supplemental negative feedback loop 210, to determine the affect of the current feedback loop 210 on phase angle and gain. FIGS. 2 and 3 are graphs which illustrate the results of these tests.

FIG. 2 plots the phase angle between the input and output voltages of the brushless exciter, as a constant voltage sinusoidal input signal is increased in frequency. Curve 250 illustrates the frequency response without negative feedback, and this curve was obtained by inserting a constant voltage, variable frequency sinusoidal signal into the regulator power amplifier input and reading the exciter output voltage via a low time constant voltage isolation transducer, as the input frequency was increased. The gain of the power amplifier was 440 A/V which, coupled with the exciter gain 1 A/V yielded an open loop gain of 52 DB and a measured time constant of 0.133 second. It will be noted that the phase angle increases rapidly as the frequency ($\omega = 2\pi f$. in radians per second) is increased.

Curve 252 shown in FIG. 2 was obtained in the same manner as curve 250, except an additional stage of amplification was inserted in series with the power amplifier, resulting in a total forward gain of 2,200 A/V, and the current feedback loop 210 was closed from the exciter field winding 22 to the input of this additional amplifier. Exciter field current feedback was derived with a current isolation transducer having a gain of 0.0127 V/A and an equivalent time delay of 0.005 second, yielding a closed loop gain of 76 A/V, an open loop gain of 27.9, and a reduction of the time constant to 0.0046 second, i.e., 0.133/(1+27.9).

The graph shown in FIG. 3 plots the gain in DB versus the frequency ($\omega$ in radians per second), with curve 254 illustrating the gain without the supplemental negative feedback, curve 256 illustrating the gain with supplemental negative feedback is compensated for by increasing the gain of the gain amplifier 240.

In summary, there has been disclosed new and improved regulated electrical power apparatus which preserves the shaft derived power concept preferred for steam turbine driven alternators, and the brushless exciter concept using shaft mounted diode rectifiers, while decreasing the effective time constant of the exciter to a value comparable with electronic excitation systems. The supplemental negative feedback loop, which is responsive to current flow through the field winding 22 of the brushless exciter 18, forces current into the field, substantially reducing the effective time constant of the excitation system. This improves the small signal dynamic performance of the excitation system and facilitates the application of supplementary power system stabilizing systems thereto.

While the new and improved regulated electrical power apparatus has been described relative to a brushless excitation system, the supplementary negative feedback loop responsive to exciter field current may also be used to advantage with the direct current type of rotating exciter.

We claim as our invention:
1. Regulated electric power apparatus, comprising:
  a dynamoelectric machine including a field winding and armature winding,
  an exciter including a field winding, and an armature connected to apply a unidirectional potential to the field winding of said dynamoelectric machine,
  means applying a controllable unidirectional potential to the field winding of said exciter,
  means providing a first signal responsive to a predetermined parameter of said dynamoelectric machine to be regulated,
  means providing a second signal responsive to the magnitude of unidirectional current flow in the field winding of said exciter,
  means combining said first and second signals to provide a third signal which opposes disturbances in the regulated parameter,
  and means applying said third signal to the means applying a controllable unidirectional potential to the field winding of said exciter, to control the magnitude of the unidirectional potential in response to said third signal.
2. The regulated electric power apparatus of claim 1 wherein the exciter is a brushless exciter with a stationary field winding a rotatable armature, and including rectifier means connected between the armature of the exciter and the field winding of the dynamoelectric machine.
3. The regulated electric power apparatus of claim 1 wherein the means applying the third signal to the means applying the controllable unidirectional potential to the field winding of the exciter includes gain amplifier means.
4. Regulated electric power apparatus, comprising:
  a dynamoelectric machine including a rotatable field winding, and a stationary armature having output terminals,
  a brushless exciter including a stationary field winding, a rotatable armature, and rectifier means having input and output terminals, said rotatable armature and rectifier means being mounted for rotation with he rotatable field winding of said dynamoelectric machine, with the input terminals of said rectifier means connected to said armature and its output terminals connected to said field winding,
  controllable excitation means connected to the field winding of said brushless exciter,
  regulator means providing a first signal responsive to a predetermined parameter of said dynamoelectric machine to be regulated,
  a negative feedback loop for reducing the response time of said brushless exciter, including means providing a second signal responsive to the magnitude of unidirectional current flow in the field winding of said brushless exciter,
  means combining said first and second signals to provide a third signal which opposes disturbances in the regulated parameter,
  and means connecting said third signal to said controllable excitation means.
5. The regulated electrical power apparatus of claim 4 including current isolation transducer means connected in the negative feedback loop to isolate the excitation winding of the brushless exciter from the regulator means.
6. The regulated electrical power apparatus of claim 4 wherein the controllable excitation means includes a permanent magnet generator having a stationary element with electrical output terminals, and a rotatable element mounted for rotation with the rotatable elements of the dynamoelectric machine and brushless exciter; a controllable bridge rectifier having input and output terminals; firing means providing control signals for said controllable bridge rectifier; means connected to the output terminals of said permanent magnet generator providing a base excitation signal, and means al- gebraically combining said base excitation signal with the third signal to provide a control signal for said firing circuit.

7. The regulated electrical power apparatus of claim 4 wherein the means connecting the third signal to the controllable excitation means includes gain amplifier means.